(12) United States Patent
Chang et al.

(10) Patent No.: US 10,539,765 B2
(45) Date of Patent: Jan. 21, 2020

(54) OPTICAL DEVICE FOR FINGERPRINT COLLECTION

(71) Applicant: Novatek Microelectronics Corp., Hsinchu (TW)

(72) Inventors: Li-Yuan Chang, Yunlin County (TW); I-Hsiu Chen, Taipei (TW); Chin-Hui Huang, Hsinch (TW)

(73) Assignee: Novatek Microelectronics Corp., Hsinchu (TW)

( * ) Notice: Subject to any disclaimer, the term of this patent is extended or adjusted under 35 U.S.C. 154(b) by 129 days.

(21) Appl. No.: 15/293,295

(22) Filed: Oct. 14, 2016

(65) Prior Publication Data

US 2017/0108672 A1 Apr. 20, 2017

Related U.S. Application Data

(60) Provisional application No. 62/241,156, filed on Oct. 14, 2015.

(51) Int. Cl.
| | |
|---|---|
| *G02B 13/14* | (2006.01) |
| *G02B 1/11* | (2015.01) |
| *G02B 5/00* | (2006.01) |
| *G02B 5/20* | (2006.01) |
| *G02B 7/02* | (2006.01) |

(52) U.S. Cl.
CPC ............ *G02B 13/14* (2013.01); *G02B 1/11* (2013.01); *G02B 5/005* (2013.01); *G02B 5/208* (2013.01); *G02B 7/02* (2013.01)

(58) Field of Classification Search
CPC .... G02B 13/001; G02B 13/008; G02B 13/14; G02B 13/24; G02B 13/26; G02B 1/11;
(Continued)

(56) References Cited

U.S. PATENT DOCUMENTS

| | | | |
|---|---|---|---|
| 6,927,844 B2 | 8/2005 | Higuchi et al. | |
| 8,204,284 B2 | 6/2012 | Wu | |

(56) References Cited

| | | | |
|---|---|---|---|
| 2008/0225297 A1* | 9/2008 | Hossu | G06K 9/00013 356/445 |
| 2017/0185234 A1 | 6/2017 | Zhang | |

FOREIGN PATENT DOCUMENTS

| | | |
|---|---|---|
| CN | 201698455 | 1/2011 |
| CN | 103699884 | 4/2014 |

(Continued)

OTHER PUBLICATIONS

WO/00/70547, Claims, English Language Machine Translation, generated Mar. 19, 2019 (Year: 2000).*

(Continued)

*Primary Examiner* — Stephone B Allen
*Assistant Examiner* — Adam W Booher
(74) *Attorney, Agent, or Firm* — JCIPRNET

(57) ABSTRACT

An optical device including a first substrate, a light source, a second substrate, an image capturing device, a microstructure layer, and an infrared pass layer is provided. The light source is disposed on the first substrate. The second substrate is disposed above the first substrate. The second substrate includes a first surface and a second surface opposite to the first surface. The image capturing device is disposed on the first substrate to receive a light beam, which is originated from scattered light beams scattered by an object touching the first surface of the second substrate. The microstructure layer is disposed on the first surface of the second substrate. The microstructure layer is adapted to increase a light beam, which is scattered by the object and transmitted to the image capturing device. The infrared pass layer is adapted to pass the infrared light.

20 Claims, 10 Drawing Sheets

(58) Field of Classification Search
CPC .......... G02B 5/00; G02B 5/003; G02B 5/005;
G02B 5/02–5/0231; G02B 5/0278; G02B
5/208; G02B 7/02; G02B 6/0001; H04L
63/0861; G06Q 20/40145; G06F 21/32;
G06K 9/00221–9/00288; G06K 9/00006;
G06K 9/00013; G06K 9/00033; G06K
9/0004; G06K 9/00046; G06K 9/00107;
G06K 9/00114; G06K 9/0012; G06K
9/00134; G06K 9/00127; G06K
2009/0006; H04W 12/06; H04W 12/08
See application file for complete search history.

(56) References Cited

FOREIGN PATENT DOCUMENTS

| CN | 104035620 | 9/2014 | |
|---|---|---|---|
| CN | 104580808 | 4/2015 | |
| TW | M401814 | 4/2011 | |
| WO | WO2000070547 | * 11/2000 | ............... G06K 9/20 |

OTHER PUBLICATIONS

"Office Action of Taiwan Counterpart Application," dated Jan. 8, 2018, p. 1-p. 5, in which the listed references were cited.
"Office Action of China Counterpart Application," dated Feb. 19, 2019, p. 1-p. 8.

* cited by examiner

OPTICAL DEVICE FOR FINGERPRINT COLLECTION

CROSS-REFERENCE TO RELATED APPLICATION

This application claims the priority benefits of U.S. provisional application Ser. No. 62/241,156, filed on Oct. 14, 2015. The entirety of the above-mentioned patent application is hereby incorporated by reference herein and made a part of this specification.

BACKGROUND OF THE INVENTION

1. Field of the Invention

The invention generally relates to an optical device, in particular, to an optical device for fingerprint collection.

2. Description of Related Art

Optical devices such as optical fingerprint collection devices are widely used for fingerprint collection and identification. The collection of fingerprints through optical devices is based on optical imaging the finger surface through optical sensors. Most conventional optical devices for fingerprint collection, such as a reflection type fingerprint reader, use a prism which is directly contacted by a finger of the user, and a light source and an image capture unit is installed at different side of the prism. Through total internal reflection and frustrated total internal reflection (FTIR), the ridge-valley patterns of a fingerprint may produce a high contrast fingerprint image. On the other hand, some optical devices for fingerprint collection use a transmission type fingerprint reader to collect the fingerprint. Light signals are transmitted into the finger and then scattered back to the image capture unit. In certain related arts, the light signals may go through the whole finger.

For an electronic device having fingerprint collection function, how to manufacture an embeddable optical fingerprint collection device that has low cost, strong mechanical strength, and satisfactory sensing quality is one of the most important topics in the pertinent field.

SUMMARY OF THE INVENTION

Accordingly, the invention is directed to an optical device for fingerprint collection, capable of being embedded into an electronic device.

An exemplary embodiment of the invention provides an optical device including a first substrate, a light source, a second substrate, an image capturing device, a microstructure layer, and an infrared pass layer. The light source is disposed on the first substrate to output a first light beam, which is an infrared light. The second substrate is disposed above the first substrate. The second substrate includes a first surface and a second surface opposite to the first surface and relatively close to the first substrate. A scattered light beam which is generated by the first light beam entering an object touching the first surface of the second substrate and scattered in the object is a second light beam. The image capturing device is disposed on the first substrate to receive a third light beam. The third light beam is the second light beam normally incident to the second surface and transmitted to the image capturing device. The microstructure layer is disposed on the first surface of the second substrate. The microstructure layer is adapted to increase a third light beam. The infrared pass layer is adapted to pass the infrared light.

In an exemplary embodiment of the invention, the infrared pass layer is disposed on one of the microstructure layer, the first surface of the second substrate, the second surface of the second substrate, and the image capturing device.

In an exemplary embodiment of the invention, the optical device further includes at least one anti-reflective layer. The at least one anti-reflective layer is disposed on at least one of the first surface and the second surface of the second substrate.

In an exemplary embodiment of the invention, the optical device further includes a first light shielding structure. The first light shielding structure is disposed on the first substrate and connected to the second substrate. The first light shielding structure locates between the light source and the image capturing device.

In an exemplary embodiment of the invention, the optical device further includes a second light shielding structure. The second light shielding structure is disposed on the first substrate and connected to the second substrate. The first light shielding structure and the second light shielding structure enclose the light source.

In an exemplary embodiment of the invention, the optical device further includes a third light shielding structure. The third light shielding structure is disposed on the first substrate, and locates between the light source and the image capturing device. The third light shielding structure extends toward the second substrate, and one end portion of the third light shielding structure is embedded into the second substrate.

In an exemplary embodiment of the invention, the optical device further includes a fourth light shielding structure. The fourth light shielding structure is disposed on the first substrate, and locates between the light source and the image capturing device. The fourth light shielding structure extends toward the second substrate, and one end portion of the light shielding structure has a support shape to support the second substrate.

In an exemplary embodiment of the invention, the optical device further includes a light guiding structure. The light guiding structure is disposed on the second surface of the second substrate and above the light source. The light guiding structure is adapted to guide the first light beam from the light source to the second substrate.

In an exemplary embodiment of the invention, the second substrate is made of a cover layer on a display panel of an electronic device.

Another exemplary embodiment of the invention provides an optical device including a first substrate, a light source, a second substrate, an image capturing device, and a light absorbing layer. The light source is disposed on the first substrate to output a first light beam, which is an infrared light. The second substrate is disposed above the first substrate. The second substrate includes a first surface and a second surface opposite to the first surface and relatively close to the first substrate. A scattered light beam which is generated by the first light beam entering an object touching the first surface of the second substrate and scattered in the object is a second light beam. The image capturing device is disposed on the first substrate to receive a third light beam. The third light beam is the second light beam normally incident to the second surface and transmitted to the image capturing device. The light absorbing layer is disposed on one of the first surface and the second surface of the second substrate. A normal projection of the light absorbing layer on the first substrate locates between the light source and the image capturing unit.

In an exemplary embodiment of the invention, the optical device further includes an infrared pass layer. The infrared pass layer is disposed on one of the first surface of the second substrate, the second surface of the second substrate and the image capturing device, and adapted to pass the infrared light. The infrared pass layer is adapted to pass the infrared light.

In an exemplary embodiment of the invention, the optical device further includes a microstructure layer. The microstructure layer is disposed on the first surface of the second substrate. The microstructure layer is adapted to increase the third light beam.

In an exemplary embodiment of the invention, the optical device further includes an infrared pass layer. The infrared pass layer is disposed on one of the microstructure layer, the first surface of the second substrate, the second surface of the second substrate, and the image capturing device. The infrared pass layer is adapted to pass the infrared light.

In an exemplary embodiment of the invention, the light absorbing layer is adapted to absorb a fourth light beam transmitted in the second substrate along a horizontal direction.

In an exemplary embodiment of the invention, the optical device further includes at least one anti-reflective layer. The at least one anti-reflective layer is disposed on at least one of the first surface and the second surface of the second substrate.

In an exemplary embodiment of the invention, the optical device further includes a first light shielding structure. The first light shielding structure is disposed on the first substrate and connected to the second substrate. The first light shielding structure locates between the light source and the image capturing device.

In an exemplary embodiment of the invention, the optical device further includes a second light shielding structure. The second light shielding structure is disposed on the first substrate and connected to the second substrate. The first light shielding structure and the second light shielding structure enclose the light source.

In an exemplary embodiment of the invention, the optical device further includes a third light shielding structure. The third light shielding structure is disposed on the first substrate, and locates between the light source and the image capturing device. The light shielding structure extends toward the second substrate, and one end portion of the light shielding structure is embedded into the second substrate.

In an exemplary embodiment of the invention, the optical device further includes a fourth light shielding structure. The fourth light shielding structure is disposed on the first substrate, and locates between the light source and the image capturing device. The fourth light shielding structure extends toward the second substrate, and one end portion of the fourth light shielding structure has a support shape to support the second substrate.

In an exemplary embodiment of the invention, the optical device further includes a light guiding structure. The light guiding structure is disposed on the second surface of the second substrate and above the light source. The light guiding structure is adapted to guide the first light beam from the light source to the second substrate.

In an exemplary embodiment of the invention, the second substrate is made of a cover layer on a display panel of an electronic device.

According to the above descriptions, in the exemplary embodiments of the invention, the optical device includes a microstructure layer and an infrared pass layer. Alternatively, the optical device includes a light absorbing layer. Accordingly, the optical device for fingerprint collection embedded into the electronic device provides a good sensing quality.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
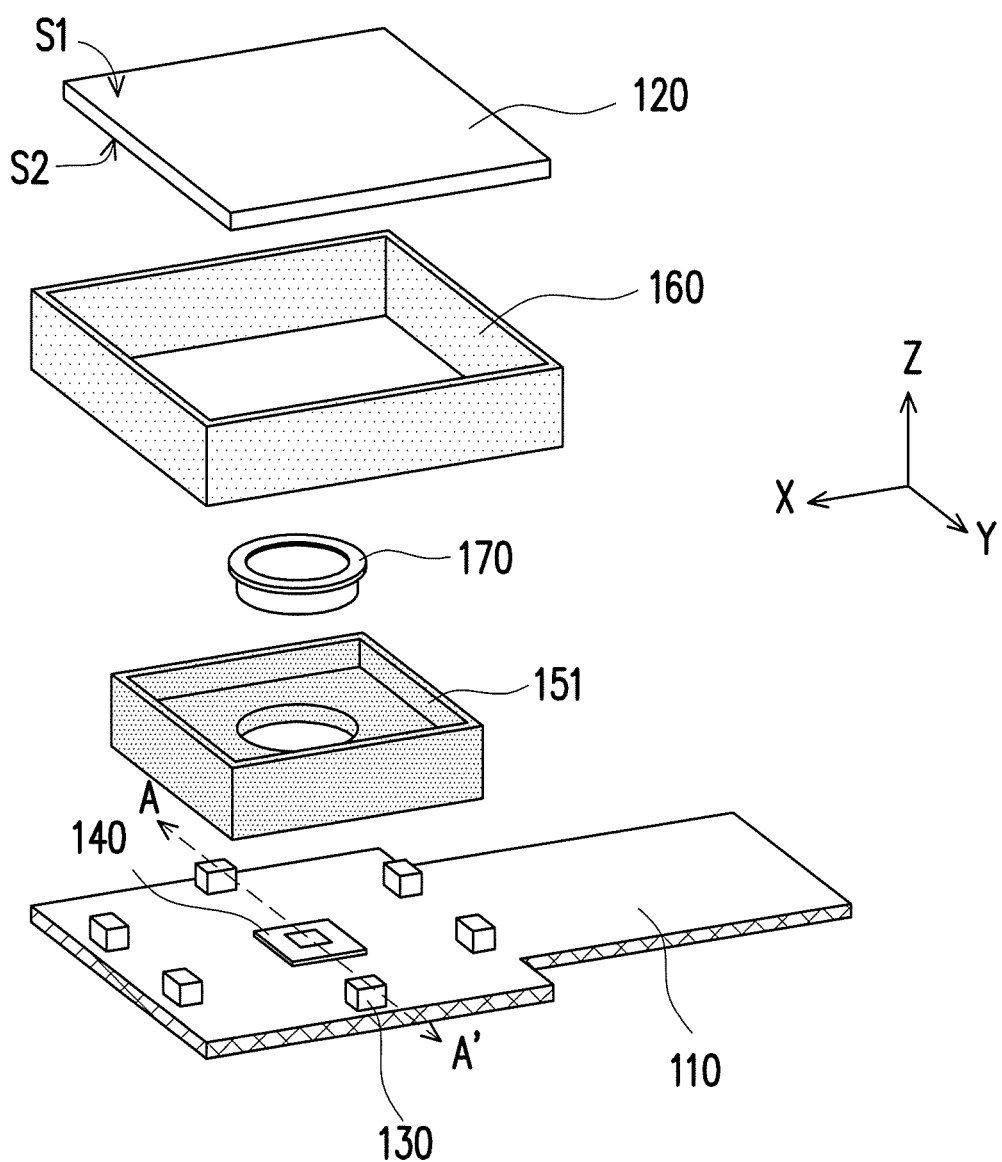
FIG. 1 illustrates an exploded view of an optical device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The term "coupling/coupled" used in this specification (including claims) of the disclosure may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

Figure 2:
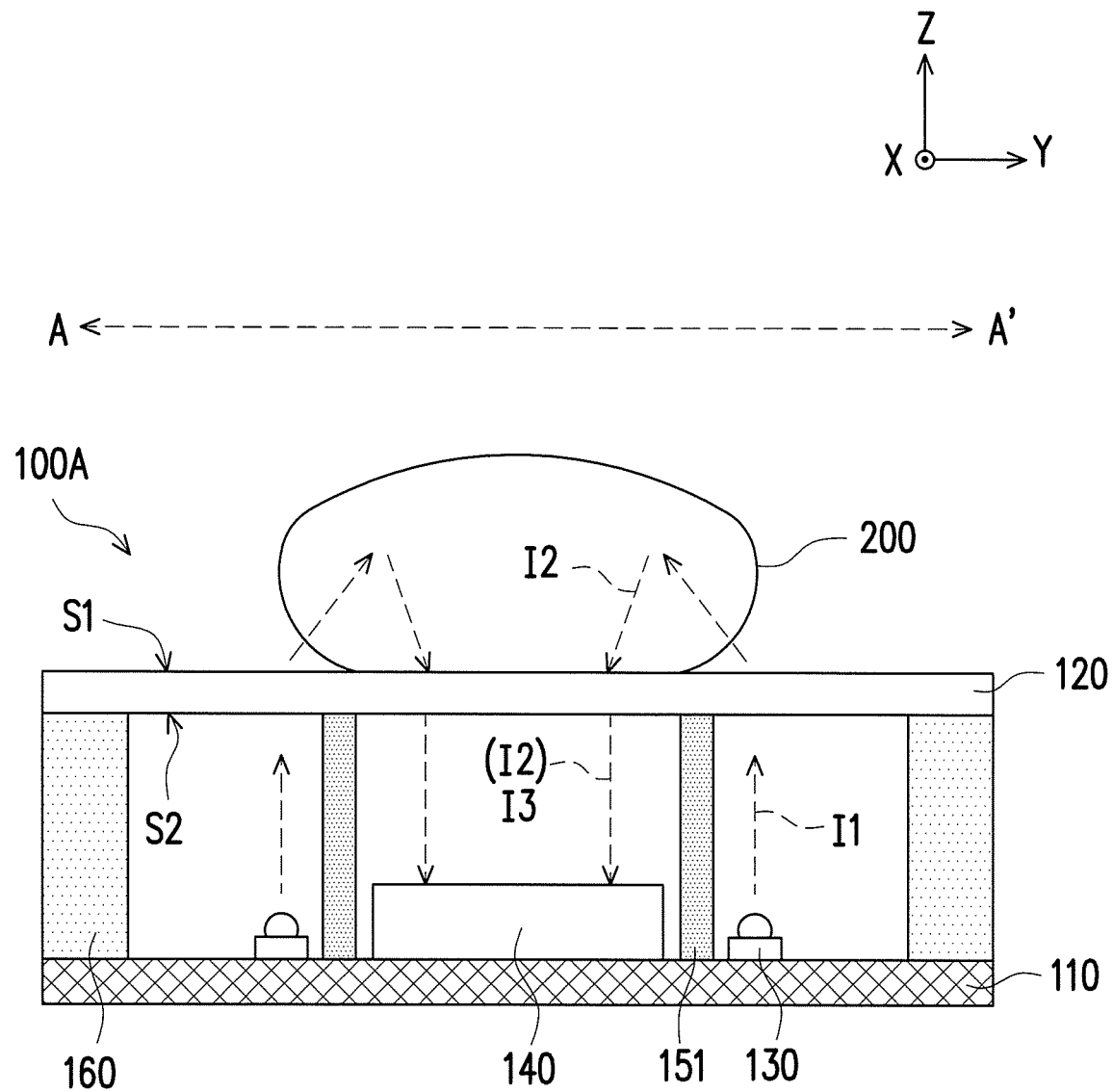
FIG. 2 illustrates a sectional view of the optical device depicted in FIG. 1 along line A-A'.

FIG. 1 illustrates an exploded view of an optical device according to an embodiment of the invention. FIG. 2 illustrates a sectional view of the optical device depicted in FIG. 1 along line A-A'. Referring to FIG. 1 and FIG. 2, an optical device 100A of the present embodiment includes a first substrate 110, a light source 130, a second substrate 120, an image capturing device 140, a light shielding structure 151 (the first light shielding structure), a supporting member 160, and a lens module 170.

In the present embodiment, the light source 130 is disposed on the first substrate 110 to output a first light beam I1. In an embodiment, the first light beam I1 is an infrared light. The first light beam I1 has intensity enough to be transmitted through the second substrate 120 and into an object 200. The light source 130 may include one or more light emitting devices surrounding the image capturing device 140 as illustrated in FIG. 1. The arrangement of the light source 130 on the first substrate 110 is not intended to limit the invention. The second substrate 120 is disposed above the first substrate 110. The second substrate 120 includes a first surface S1 and a second surface S2. The second surface S2 is opposite to the first surface S1 and relatively close to the first substrate 110. In the present embodiment, the first substrate 110 is a printed circuit board, and the second substrate 120 may be made of glass, ceramics or acrylic, and the invention is not limited thereto. In an embodiment, a visible light source with high intensity, e.g. a red light source of high intensity, may be adopted for the light source 130.

In the present embodiment, the first light beam I1 is originally transmitted from the light source 130, and transmitted through the second substrate 120 into the object 200 touching the first surface S1 of the second substrate 120. The first light beam I1 is scattered in object 200 to generate second light beams I2 in various directions. A part of the second light beams I2 that are normally incident to the second surface S2 are transmitted through the second substrate 120 to be as third light beams I3 transmitted toward the image capturing device 140, and enters the image capturing device 140. In the present embodiment, the image capturing device 140 is disposed on the first substrate 110 to receive the third light beams I3. It is noted that the second light beam I2 shown in the drawings is an example and the direction of the depicted second light beam I2 does not mean a limitation but indicate that the second light beam I2 is a scattered light beam (in any possible direction), scattered in the object 200.

In the present embodiment, the object 200 may be a finger of a user, and thus the optical device 100A is configured for fingerprint collection. In the present embodiment, the image capturing device 140 includes, for example, a charge coupled device image sensor (CCD image sensor) or a complementary metal oxide semiconductor (CMOS) image sensor or the like, which are not particularly limited by the invention. In the applications of the optical device 100A or the other optical device described in the following, the object 200 is not limited to finger. The object 200 can be, but not limited to, a biological texture such as palm print, or a biological signal such as pulse signal.

In the present embodiment, the light shielding structure 151 is disposed on the first substrate 110 and connected to the second substrate 120. The light shielding structure 151 is located between the light source 130 and the image capturing device 140. In the present embodiment, the light shielding structure 151 may serve as a light shielding mechanism to avoid environment lights entering the image capturing device 140; more precisely, the light shielding structure 151 may be used for avoiding other light beams (generated in a different way from the second light beam I2) entering the image capturing device 140. In the present embodiment, the light shielding structure 151 may also serve as a supporting member to support the second substrate 120. In the present embodiment, the light shielding structure 151 may also serve as a holder, and the lens module 170 is disposed on the light shielding structure 151. The lens module 170 is configured to focus the third light beams I3 to be captured by the image capturing device 140. For clarity, the lens module 170 is not illustrated in FIG. 2. In addition, the supporting member 160 of the present embodiment is disposed on the first substrate 110 and connected to the second substrate 120, so as to support the second substrate 120.

In the present embodiment, the lens module 170 may include one or more lenses disposed on the transmission path of the second light beam I2 between the second substrate 120 and the image capturing device 140. In an embodiment, the lens module 170 may at least include a non-plane lens with a refractive power, for example, a biconcave lens, a biconvex lens, a concave-convex (negative meniscus) lens, a convex-concave (positive meniscus) lens, a plano-convex lens, a plano-concave lens, etc. In an embodiment, the lens module 170 may also include a planar lens. The implementation and type of the lens module 170 are not limited in the invention.

Figure 3:
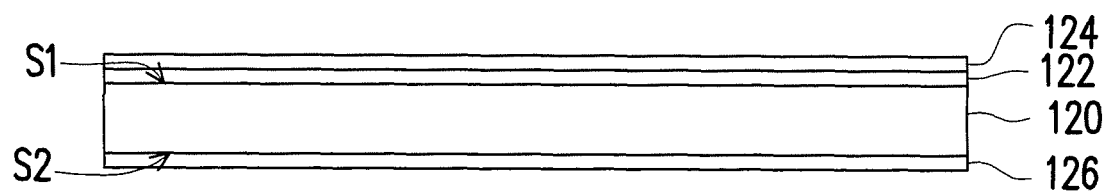
FIG. 3 illustrates a schematic diagram of the second substrate depicted in FIG. 1 with optical films according to an embodiment of the invention.

FIG. 3 illustrates a schematic diagram of the second substrate depicted in FIG. 1 with optical films according to an embodiment of the invention. Referring to FIG. 1 to FIG. 3, the optical device 100A of the present embodiment further includes a microstructure layer 122, an infrared pass layer 124, and an anti-reflective layer 126.

In the present embodiment, the microstructure layer 122 is disposed on the first surface S1 of the second substrate 120. The microstructure layer 122 is adapted to increase the third light beams I3, which area part of the second light beams I2 that are normally incident to the second surface S2 and transmitted through the second substrate 120 to the image capturing device 140. In the present embodiment, the third light beam I3 may substantially normally enter the image capturing device 140 to increase the quality of the image of the object 200, e.g., fingerprint, captured by the image capturing device 140. In the present embodiment, the microstructure layer 122 may include a plurality of ball particles with diameters ranging from 10 to 100 micrometers to serve as microstructures for scattering light beams. However, the shape, the material, and the size of the ball particles are not intended to limit the invention. In an embodiment, the microstructure layer 122 may be made by applying a surface processing on a surface of an original material of the second substrate 120 such that the material after the surface processing has a rough, not smooth surface, which can be regarded as so-called microstructure layer in combination with the second substrate 120. The infrared pass layer 124 is adapted to pass the infrared light. More specifically, the infrared pass layer 124 is adapted to pass only the infrared light and block (or filter) other visible/invisible light which has a wavelength out of the range of wavelength of infrared light. In the present embodiment, the infrared pass layer 124 is disposed on the microstructure layer 122. Alternatively, the infrared pass layer 124 may be disposed on the first surface S1 of the second substrate 120 and located between the microstructure layer 122 and the second substrate 120 in another embodiment, or the infrared pass layer 124 may be disposed on the second surface S2 of the second substrate 120 in still another embodiment, or the infrared pass layer 124 may be disposed on the image capturing device 140 in still another embodiment. The location of the infrared pass layer 124 is not intended to limit the invention. In another exemplary embodiment that the visible light (such as red light) source with high intensity is adopted for the light source 130, the infrared pass layer 124 may be replaced by a red visible light pass layer, which passes the red light. In another embodiment, the second substrate 120 may be made for implementing the function of the infrared pass layer 124, and in such a case the infrared pass layer 124 of FIG. 3 is no longer required. For example, a specific dyeing material which realizes passing only the infrared lights may be added into the material of the second substrate 120 (such as acrylic or glass) during manufacturing the second substrate 120.

In the present embodiment, the anti-reflective layer 126 is disposed on the second surface S2 of the second substrate 120 to reduce light beams that are reflected from the second surface S2 and directly enter the image capturing device 140 without being transmitted into the object 200, when incident light beams emitted by the light source 130 travels toward the second surface S2 of the second substrate 120. In the present embodiment, the anti-reflective layer 126 may be disposed on the entire second surface S2, or disposed on only a part of the second surface S2 right above the light source 130. In another embodiment, the optical device 100A may include another anti-reflective layer, different from the anti-reflective layer 126 of FIG. 3, disposed on the first surface S1 of the second substrate 120 to reduce reflected light beams at the first surface S1 when scattered light beams in the object 200 are being as incident light beams to the first surface S1, so as to increase light beams that are originated from scattered light beams in the object 200 and transmitted through the second substrate 120 to the image capturing device 140. In another embodiment, the optical device 100A may include an anti-reflective layer disposed on the second surface S2 such as the anti-reflective layer 126 of FIG. 3 and also another anti-reflective layer disposed on the second surface S1 such as the aforementioned. In an embodiment, the anti-reflective layer 126 is optional since the reflection of light beams by the first surface S1 and the second surface S2 may be reduced by selecting adaptive material for the second substrate 120.

Figure 4:
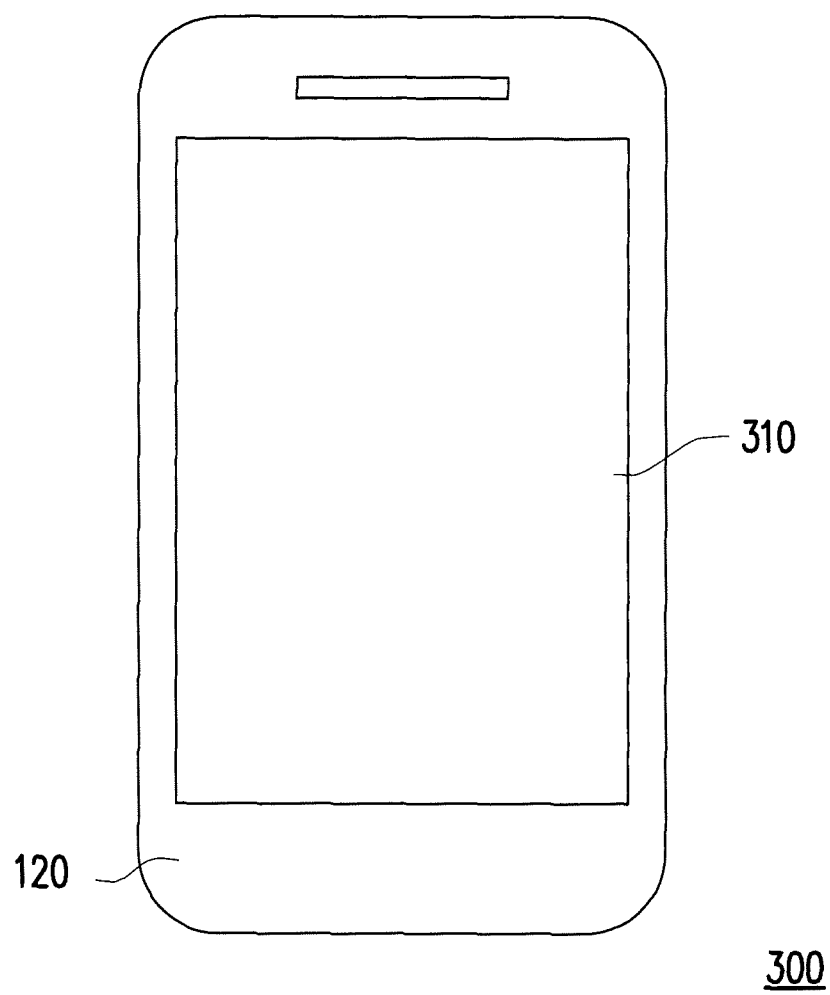
FIG. 4 illustrates a schematic diagram of an electronic device according to an embodiment of the invention.

FIG. 4 illustrates a schematic diagram of an electronic device according to an embodiment of the invention. Referring to FIG. 1 and FIG. 4, the optical device 100A depicted in FIG. 1 may be implemented in the electronic device 300. For example, the second substrate 120 may be made of a cover layer on a display panel 310 of the electronic device 300 for protecting the display panel 310 and contacting the object 200. In the present embodiment, the optical device 100A may be disposed on a non-display area of the display panel 310.

In the present embodiment, the display panel 310 may be a liquid crystal display (LCD) panel, an organic light emitting display (OLED) panel, a field emission display (FED) panel, an electro-phoretic display (EPD) panel or a light emitting diode display panel and the like, which are not limited in the invention. In the present embodiment, the electronic device 300 may be a portable electronic device having fingerprint collection function, such as a cell phone, a tablet, a notebook, a wearable electronic device having fingerprint collection function, such as a smart watch, and the like, which is not limited in the invention. In an embodiment, the optical device 100A may be applied to a smart lock.

Figure 5:
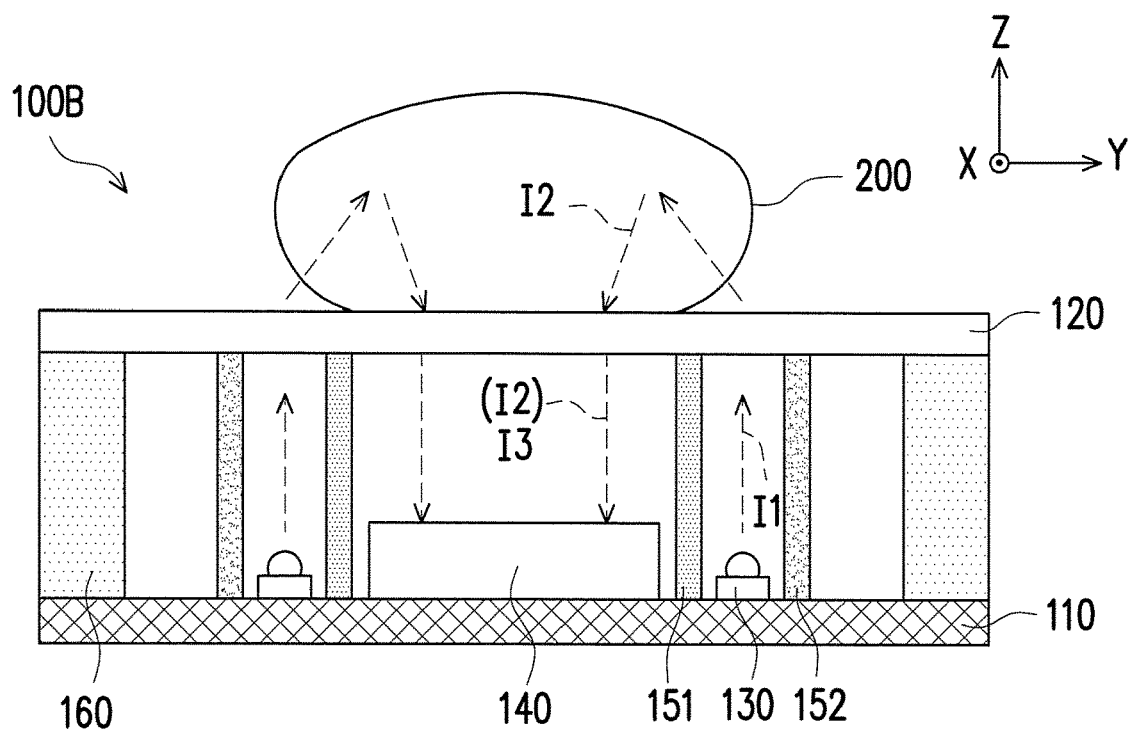
FIG. 5 illustrates a sectional view of an optical device according to another embodiment of the invention.

FIG. 5 illustrates a sectional view of an optical device according to another embodiment of the invention. Referring to FIG. 2 and FIG. 5, the optical device 100B of the present embodiment is similar to the optical device 100A depicted in FIG. 2, and a main difference therebetween, for example, lies in that the optical device 100B further includes another light shielding structure 152 (the second light shielding structure).

In the present embodiment, the light shielding structure 152 is disposed on the first substrate 110 and connected to the second substrate 120. The light shielding structures 151 and 152 enclose the light source 130. The first light beam I1 is transmitted in a space between the light shielding structures 151 and 152. In the present embodiment, the light shielding structure 152 may serve as a light shielding mechanism to avoid environment lights entering the image capturing device 140. In the present embodiment, the light shielding structure 152 may also serve as a supporting member to support the second substrate 120.

Figure 6:
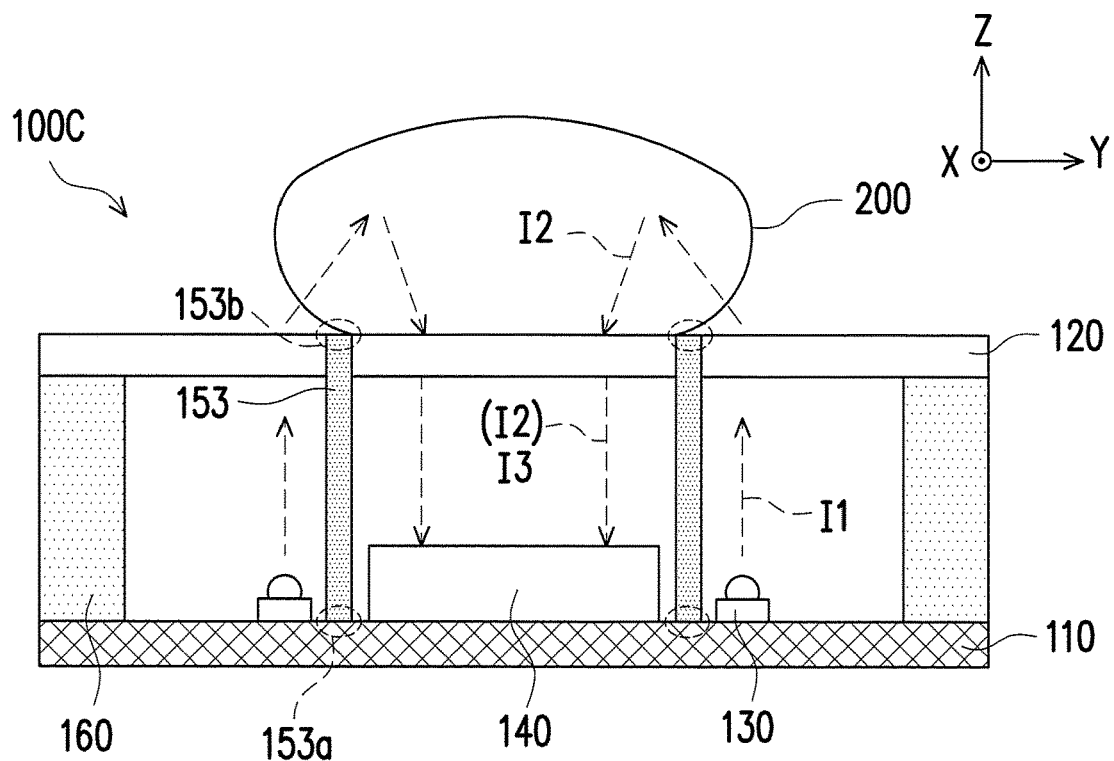
FIG. 6 illustrates a sectional view of an optical device according to another embodiment of the invention.

FIG. 6 illustrates a sectional view of an optical device according to another embodiment of the invention. Referring to FIG. 2 and FIG. 6, the optical device 100C of the present embodiment is similar to the optical device 100A depicted in FIG. 2, and a main difference therebetween, for example, lies in that a connection between a light shielding light structure 153 (the third light shielding structure) and the second substrate 120.

Figure 7:
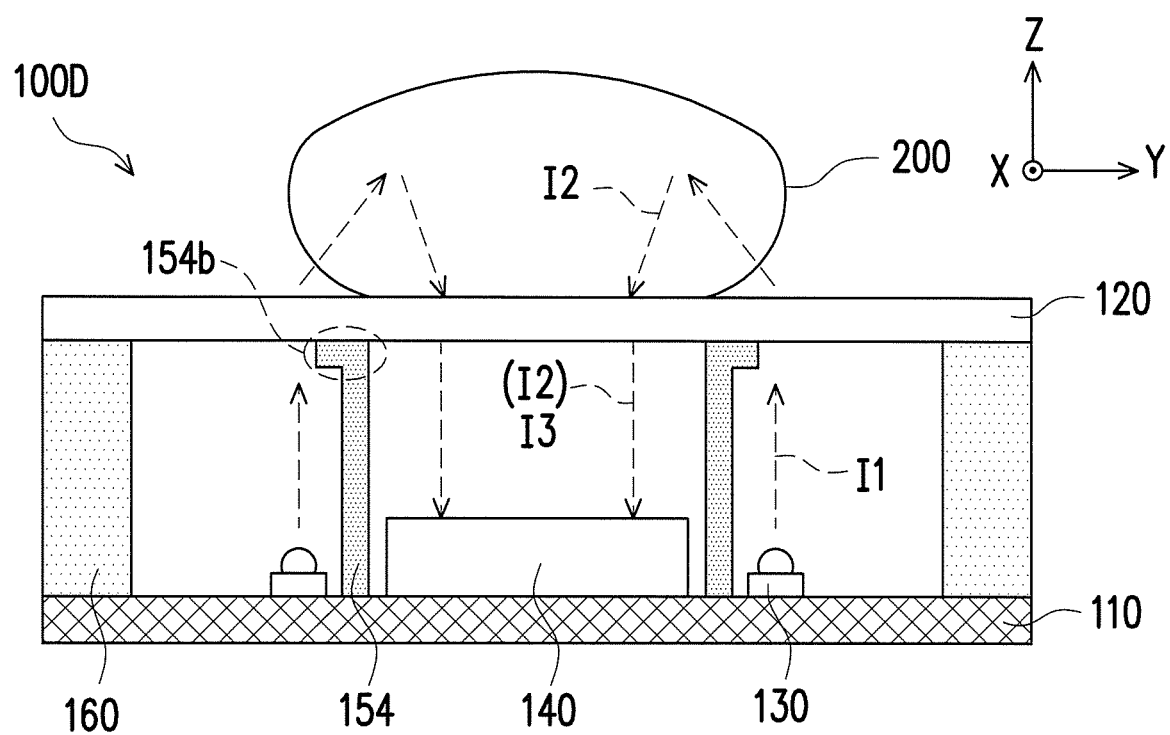
FIG. 7 illustrates a sectional view of an optical device according to another embodiment of the invention.

In the present embodiment, the light shielding structure 153 is disposed on the first substrate 110 and located between the light source 130 and the image capturing device 140. The light shielding structure 153 extends toward the second substrate 120. The light shielding structure 153 includes a first end portion 153*a* and a second end portion 153*b*. One end portion, i.e. the second end portion 153*b*, of the light shielding structure 153 is embedded into the second substrate 120. Another end portion, i.e. the first end portion 153*a*, of the light shielding structure 153 is connected to the first substrate 110. In the present embodiment, the second substrate 120 is divided into a portion enclosed by the light shielding structure 153 and the other portion out of the light shielding structure 153 as illustrated in FIG. 6. The light shielding structure 153 of FIG. 6 brings a benefit that is to stop the light travelling inside the second substrate 120 and to prevent such light beams from being refracted, not transmitted into the object 200, and received by the image capturing device 140. This kind of received light beams originated from the light travelling inside the second substrate 120 is interference and may result in an inverse dark-bright pattern compared to an expected pattern resulted from the expected received light beams originated from the scattered light beams (I2) in the object 200. FIG. 7 illustrates a sectional view of an optical device according to another embodiment of the invention. Referring to FIG. 2 and FIG. 7, the optical device 100D of the present embodiment is similar to the optical device 100A depicted in FIG. 2, and a main difference therebetween, for example, lies in that a connection between a light shielding light structure 154 (the fourth light shielding structure) and the second substrate 120.

In the present embodiment, the light shielding structure 154 is disposed on the first substrate 110 and located between the light source 130 and the image capturing device 140. The light shielding structure 154 extends toward the second substrate 120. One end portion 154*b* of the light shielding structure 154 near the second substrate 120 has a support shape, e.g. L-shape, to support the second substrate 120. The support shape may enhance supporting strength for the second substrate 120.

Figure 8:
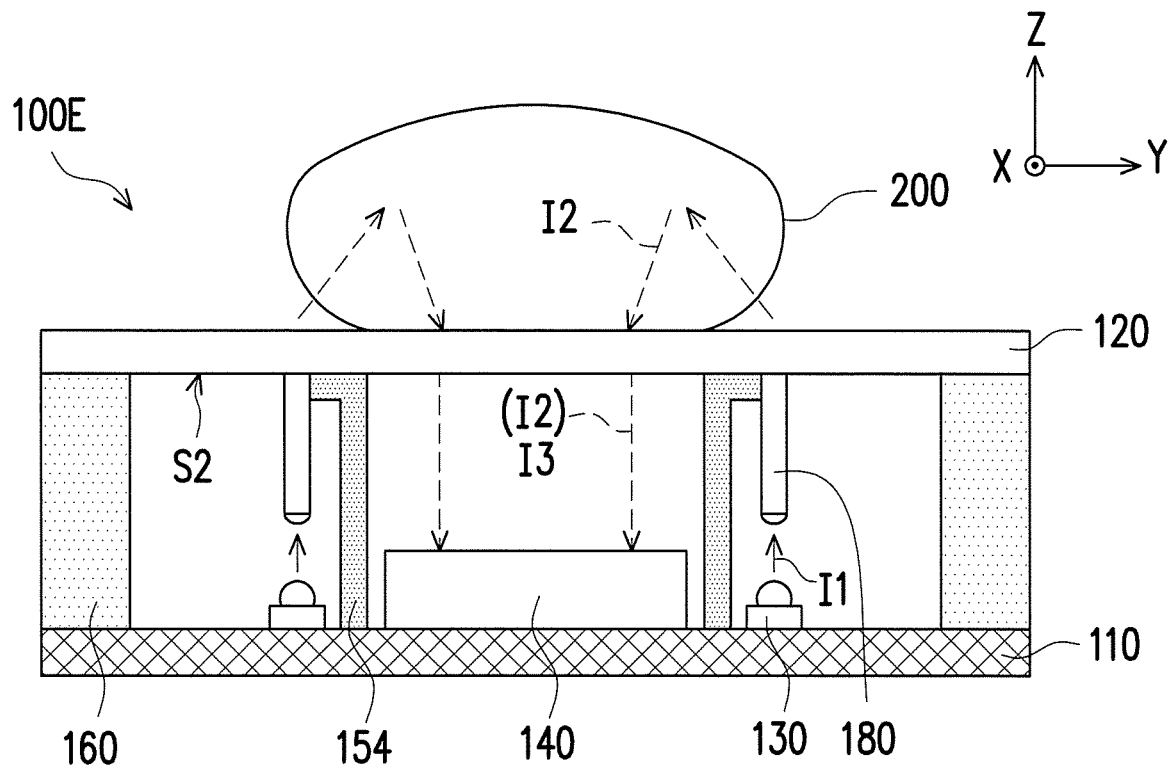
FIG. 8 illustrates a sectional view of an optical device according to another embodiment of the invention.

FIG. 8 illustrates a sectional view of an optical device according to another embodiment of the invention. Referring to FIG. 7 and FIG. 8, the optical device 100E of the present embodiment is similar to the optical device 100D depicted in FIG. 7, and a main difference therebetween, for example, lies in that the optical device 100E further has a light guiding structure 180.

In the present embodiment, the light guiding structure 180 is disposed on the second surface S2 of the second substrate 120 and above the light source 130. In an embodiment, the light guiding structure 180 may be fixed on the second surface S2 of the second substrate 120 and simply contact the light shielding structure 154. Alternatively, the light guiding structure 180 may be adhered to the light shielding structure 154 in another embodiment. In an embodiment, the light guiding structure 180 may approach the light source 130 and cover the light source 130 to enhance light guide efficiency, but the invention is not limited thereto. The light-guiding structure 180 is adapted to guide the first light beam I1 from the light source 130 to the second substrate 120.

The detail structures of the optical devices 100B to 100E in the exemplary embodiments depicted in FIG. 5 to FIG. 8 are sufficiently taught, suggested, and embodied in the embodiments illustrated in FIG. 1 to FIG. 4, and therefore no further description is provided herein.

Figure 9:
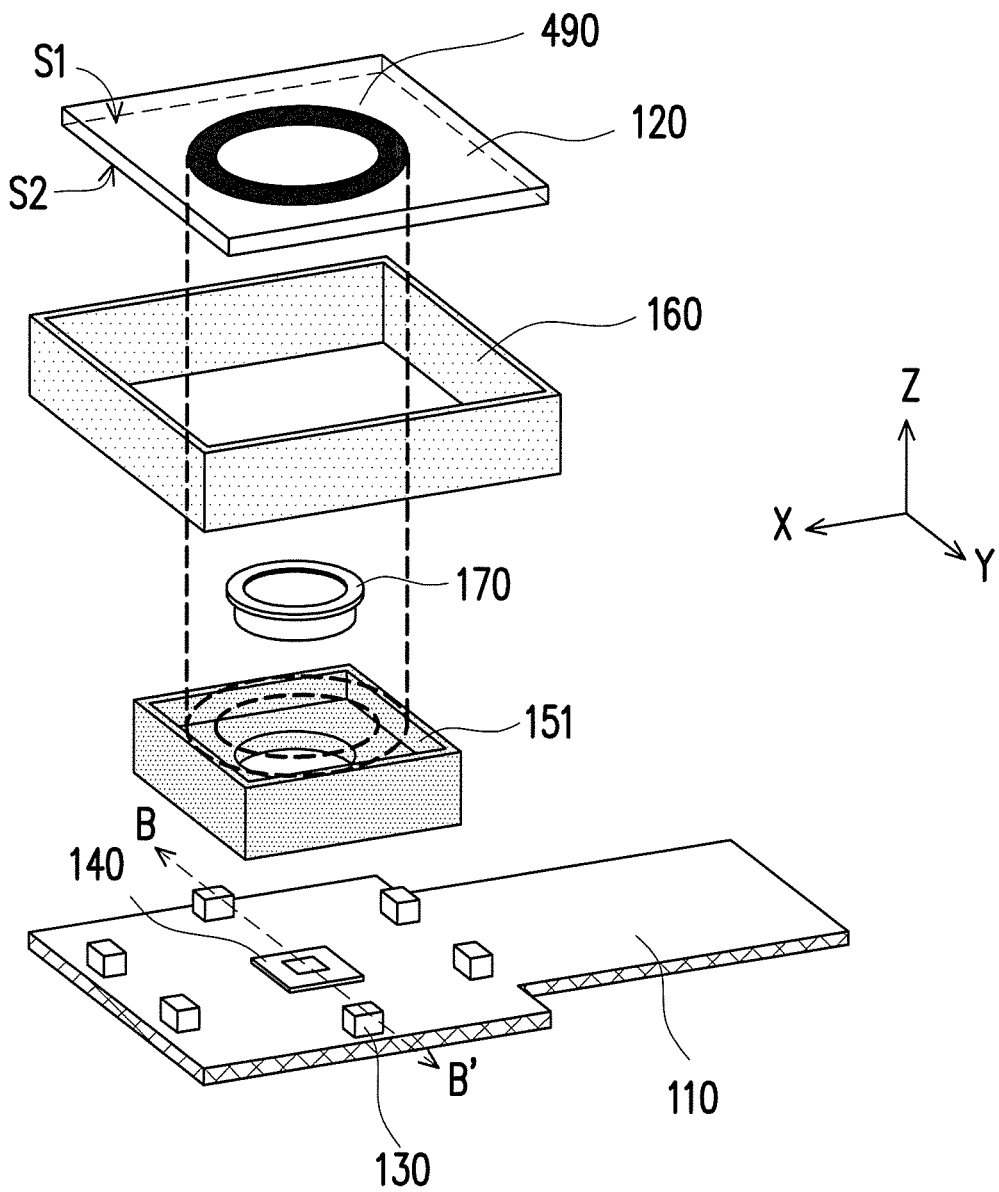
FIG. 9 illustrates an exploded view of an optical device according to another embodiment of the invention.
Figure 10:
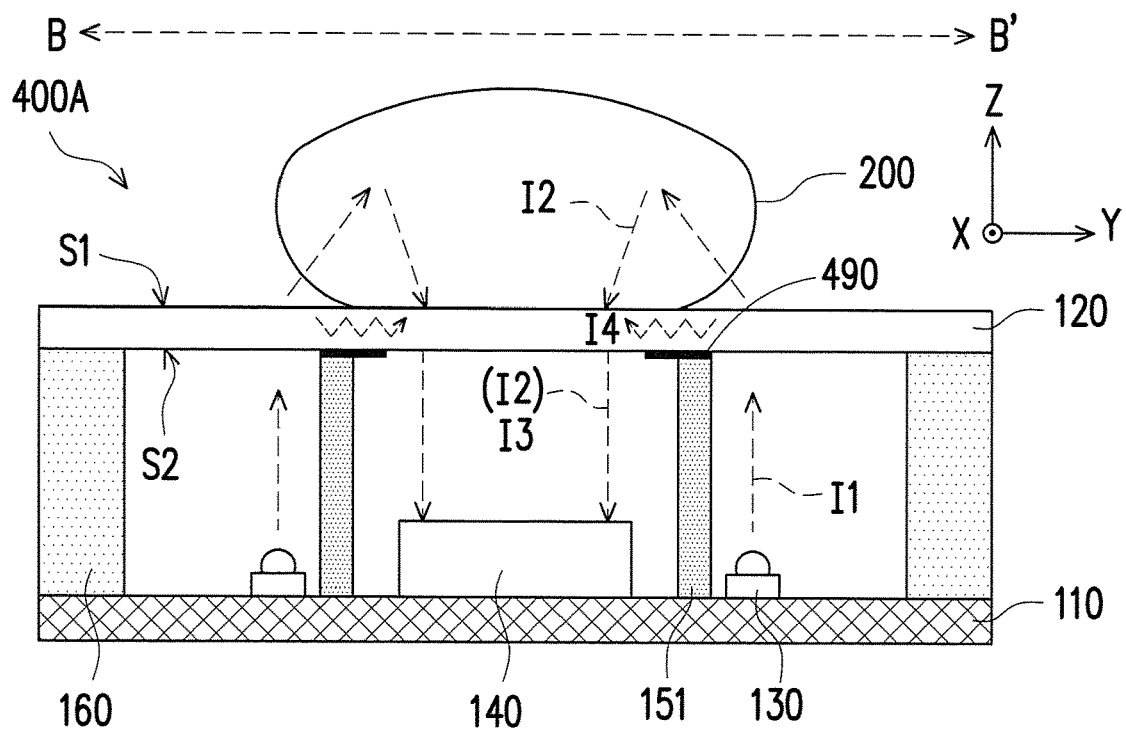
FIG. 10 illustrates a sectional view of the optical device depicted in FIG. 9 along line B-B'.

FIG. 9 illustrates an exploded view of an optical device according to another embodiment of the invention. FIG. 10 illustrates a sectional view of the optical device depicted in FIG. 9 along line B-B'. Referring to FIG. 1, FIG. 2, FIG. 9 and FIG. 10, the optical device 400A of the present embodiment is similar to the optical device 100A depicted in FIG. 1 and FIG. 2, and a main difference therebetween, for example, lies in that the optical device 400A further includes a light absorbing layer 490. It should be noted that there is a fourth light beam I4 transmitted inside the second substrate 120 along the horizontal direction, e.g. X direction and/or Y direction. The fourth light beam I4 may include the first light beam I1 entering the second substrate 120 and/or environment lights entering the second substrate 120. A part of the fourth light beam I4 may be reflected from the first surface S1, not enter the object 200, and be as the incident light beams to the surface S2 and received by the image capturing device 140. This kind of light beam results in an inverse dark-bright pattern of the object 120 which is regarded as interference. For example, an expected fingerprint pattern resulted from the light beams I3 (which are originated from the scattered second light beams I2 in the object 200) shows bright ridges and dark valleys, while an interference pattern resulted from the light beam I4 shows dark ridges and bright valleys which eliminates the contrast of the expected fingerprint pattern. In the present embodiment, the light absorbing layer 490 is disposed on the second surface S2 of the second substrate 120. The light absorbing layer 490 is adapted to absorb the fourth light beam I4 (as the incident light beams to the surface S2) such that the fourth light beam I4 has no (or little) energy to be received to result in the interference pattern. Accordingly, the quality of fingerprint image captured by the image capturing device 140 is increased.

Figure 11:
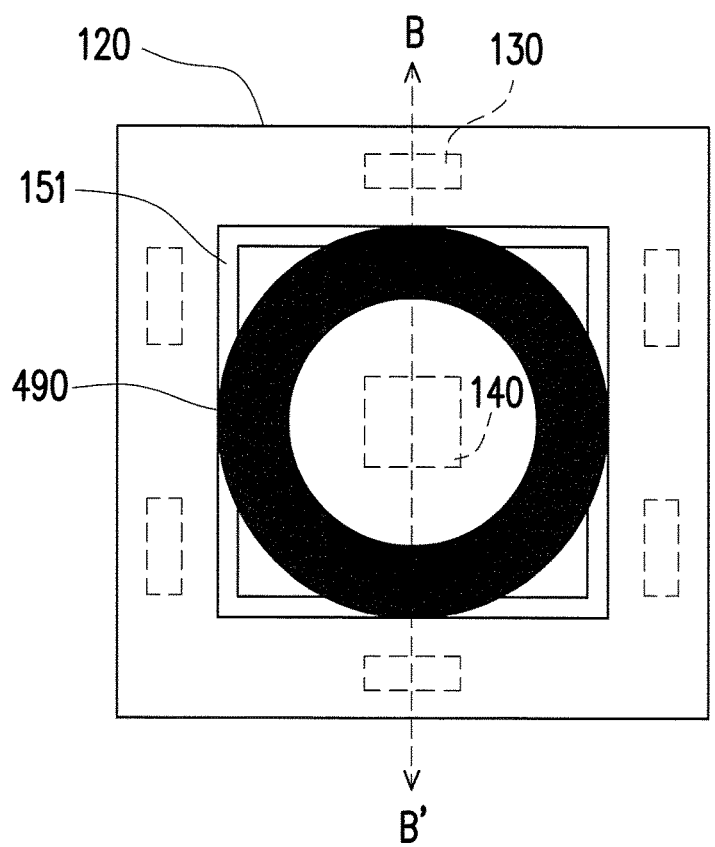
FIG. 11 illustrates a bottom view of the second substrate with the light absorbing layer depicted in FIG. 10.

In the present embodiment, the light absorbing layer 490 may be a black mask painted (or coated) on the second surface S2 of the second substrate 120 to absorb light beams I4. The shape of the light absorbing layer 490 may be a circle ring, a rectangle ring, a square ring, or any closed shape with a hollow area. The invention is not intended to limit the shape of the light absorbing layer 490. FIG. 11 illustrates a bottom view of the second substrate with the light absorbing layer depicted in FIG. 10. Referring to FIG. 9 to FIG. 11, in the present embodiment, the normal projection of the light absorbing layer 490 on the first substrate 110 is located between the light source 130 and the image capturing unit 140 as illustrated in FIG. 10. The position and shape of the light absorbing layer 490 is considered to prevent the first light beam I1 and the second light beams I2 (I3) from being absorbed too much by the light absorbing layer 490, since the first light beam I1 has to be transmitted into the object 200 though the second substrate 120 and the second light beams I2 (I3) have to be received by the image capturing device 140.

Figure 12:
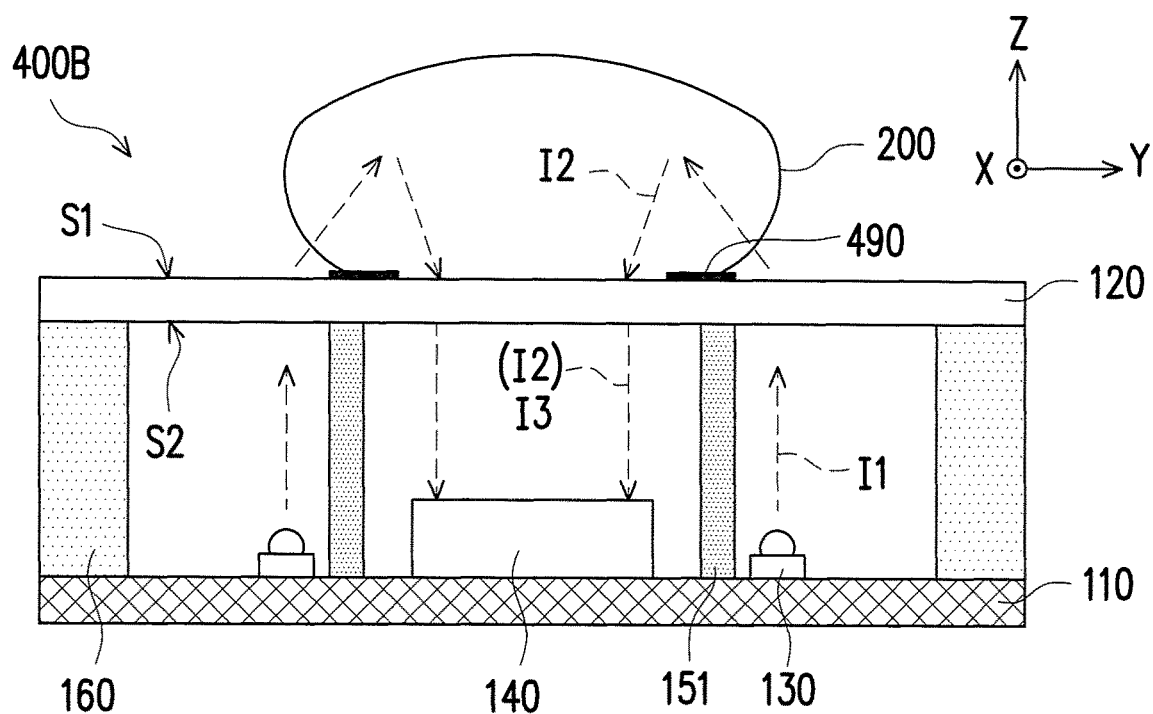
FIG. 12 illustrates a sectional view of an optical device according to another embodiment of the invention.

FIG. 12 illustrates a sectional view of an optical device according to another embodiment of the invention. Referring to FIG. 10 and FIG. 12, the optical device 400B of the present embodiment is similar to the optical device 400A depicted in FIG. 10, and a main difference therebetween, for example, lies in that the light absorbing layer 490 is disposed on the first surface S1 of the second substrate 120. The light absorbing layer 490 painted/coated on the first surface S1 is adapted to absorb the fourth light beam I4 (as the incident light beams to the surface S1) such that the fourth light beam I4 has no (or little) energy to be reflected from the surface S1 and generate the interference pattern.

Figure 13:
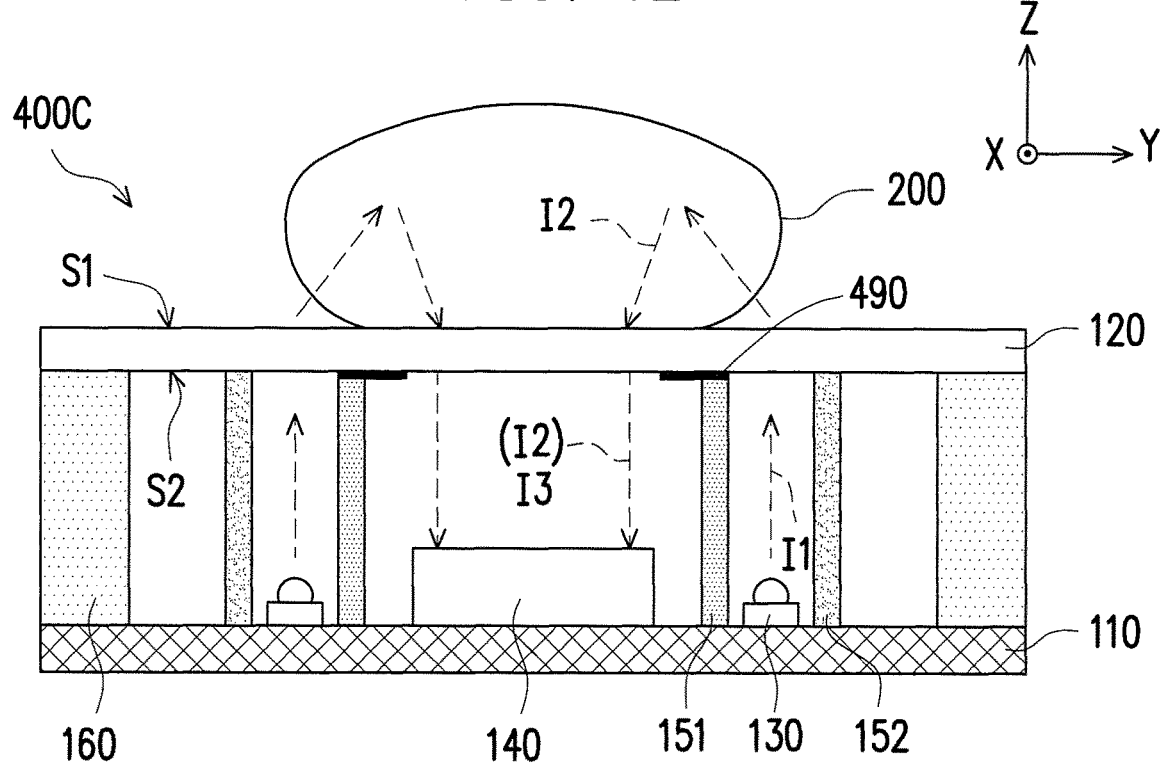
FIG. 13 illustrates a sectional view of an optical device according to another embodiment of the invention.

FIG. 13 illustrates a sectional view of an optical device according to another embodiment of the invention. Referring to FIG. 5 and FIG. 13, the optical device 400C of the present embodiment is similar to the optical device 100B depicted in FIG. 5, and a main difference therebetween, for example, lies in that the optical device 400C further includes the light absorbing layer 490. In the present embodiment, the light absorbing layer 490 is disposed on the second surface S2 of the second substrate 120, and is located between the light shielding structure 151 and the second substrate 120. In an embodiment, the light absorbing layer 490 may be disposed on the first surface S1 of the second substrate 120.

Figure 14:
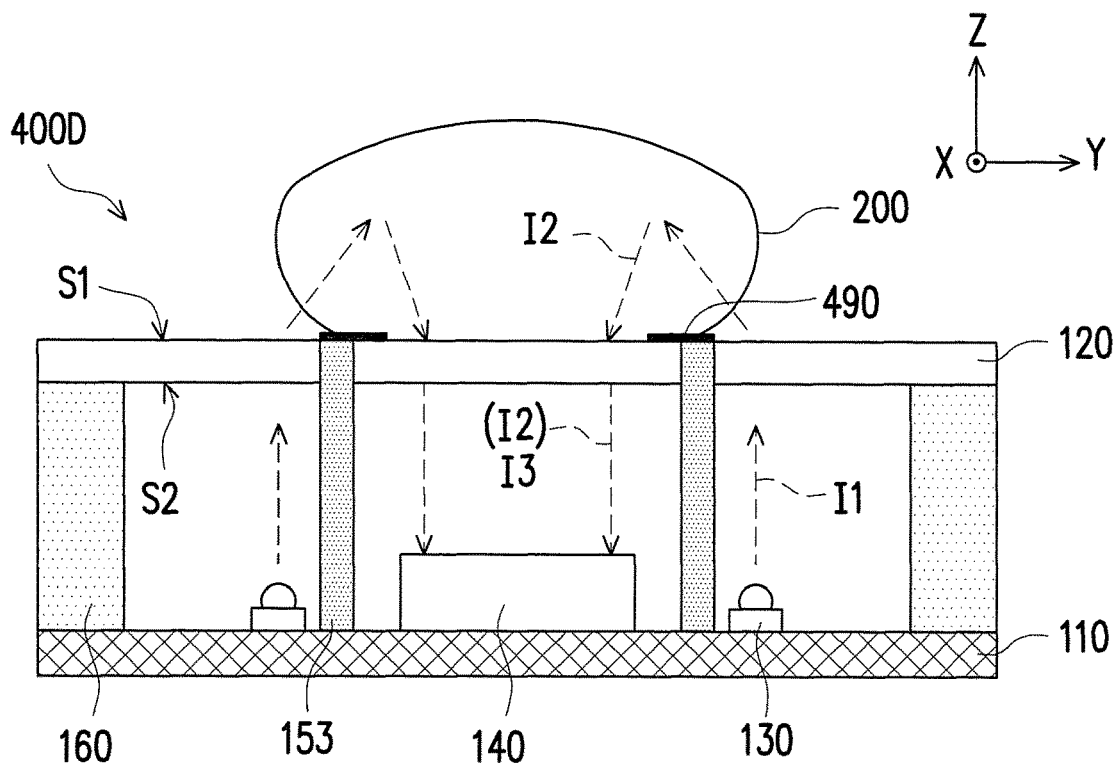
FIG. 14 illustrates a sectional view of an optical device according to another embodiment of the invention.

FIG. 14 illustrates a sectional view of an optical device according to another embodiment of the invention. Referring to FIG. 6 and FIG. 14, the optical device 400D of the present embodiment is similar to the optical device 100C depicted in FIG. 6, and a main difference therebetween, for example, lies in that the optical device 400C further includes the light absorbing layer 490. In the present embodiment, the light absorbing layer 490 is disposed on the first surface S1 of the second substrate 120.

Figure 15:
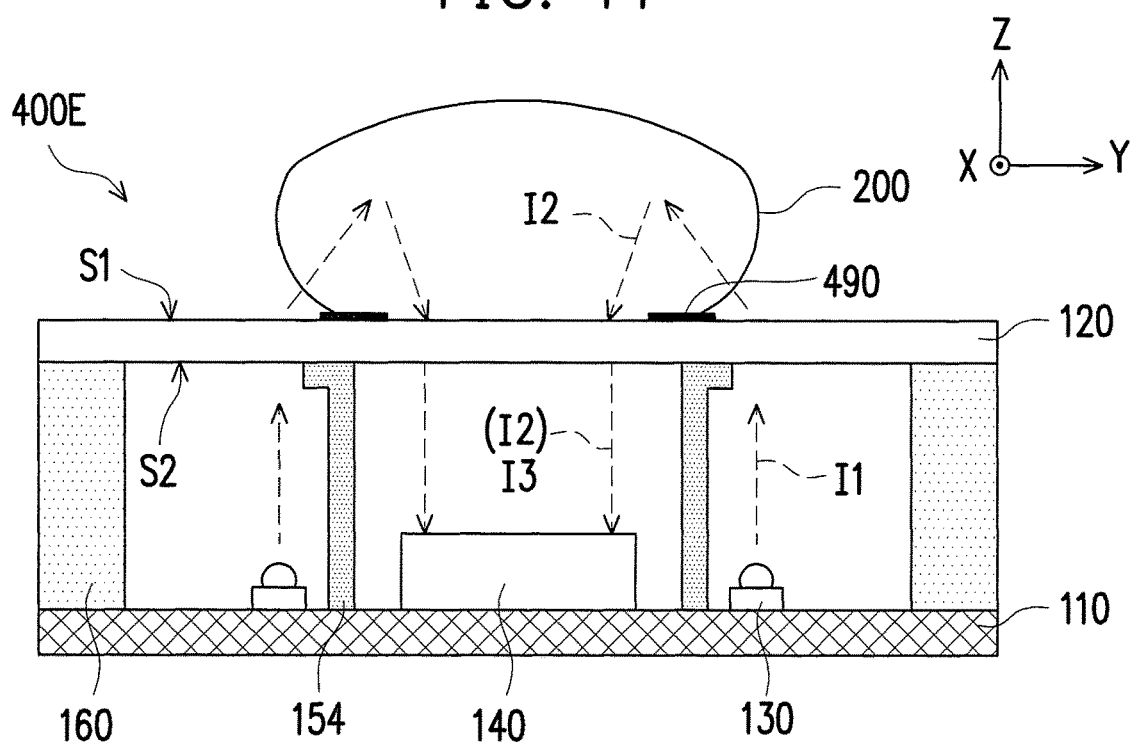
FIG. 15 illustrates a sectional view of an optical device according to another embodiment of the invention.

FIG. 15 illustrates a sectional view of an optical device according to another embodiment of the invention. Referring to FIG. 7 and FIG. 15, the optical device 400E of the present embodiment is similar to the optical device 100D depicted in FIG. 7, and a main difference therebetween, for example, lies in that the optical device 400E further includes the light absorbing layer 490. In the present embodiment, the light absorbing layer 490 is disposed on the first surface S1 of the second substrate 120. In an embodiment, the light absorbing layer 490 may be disposed on the second surface S2 of the second substrate 120.

Figure 16:
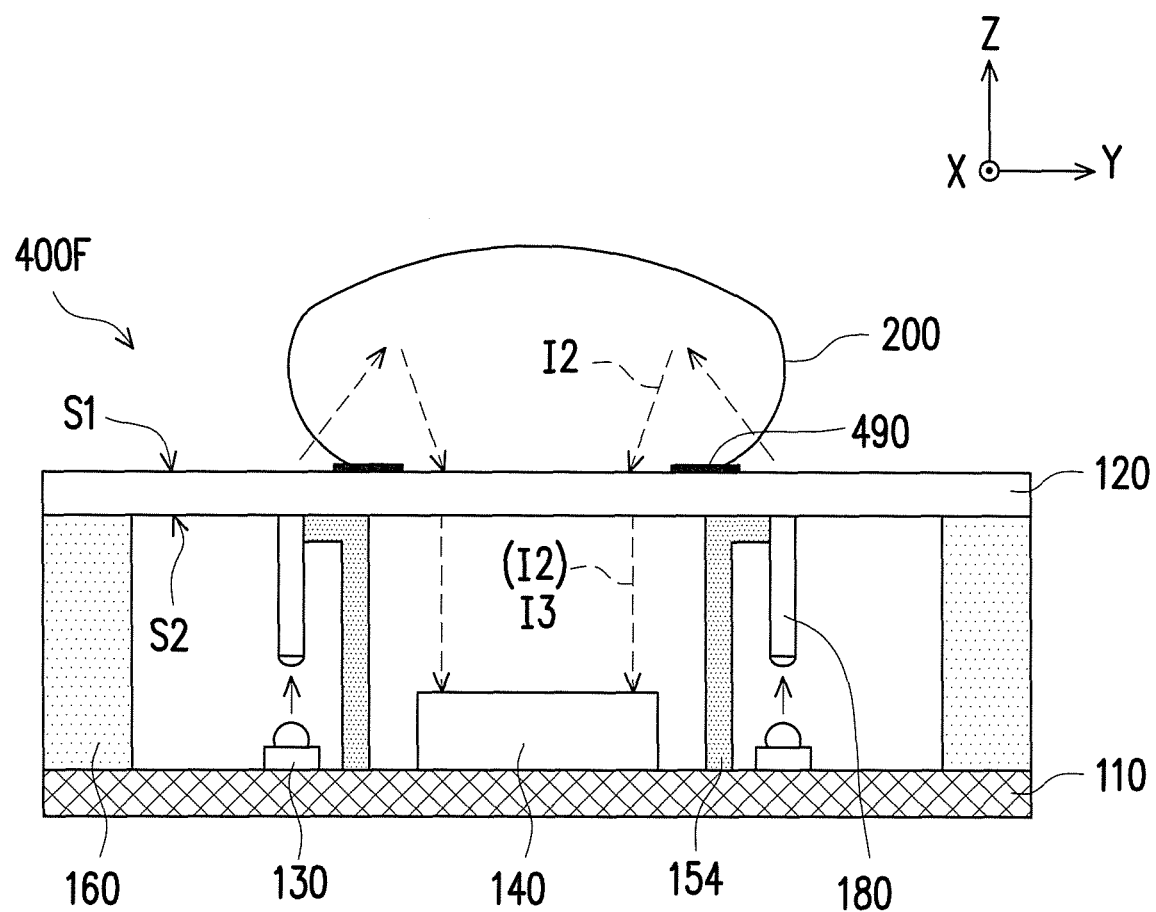
FIG. 16 illustrates a sectional view of an optical device according to another embodiment of the invention.

FIG. 16 illustrates a sectional view of an optical device according to another embodiment of the invention. Referring to FIG. 8 and FIG. 16, the optical device 400F of the present embodiment is similar to the optical device 100E depicted in FIG. 8, and a main difference therebetween, for example, lies in that the optical device 400F further includes the light absorbing layer 490. In the present embodiment, the light absorbing layer 490 is disposed on the first surface S1 of the second substrate 120. In an embodiment, the light absorbing layer 490 may be disposed on the second surface S2 of the second substrate 120. It is noted that the second substrate 120 of FIGS. 9-16 also includes an infrared pass layer (not shown) which is similar to the infrared pass layer 124 of FIG. 3. This infrared pass layer may be disposed on the first surface S1 of the second substrate 120, on the second surface S2 of the second substrate 120, on a microstructure layer (if included), or on the image capturing device 140.

The detail structures of the optical devices 400A to 400E in the exemplary embodiments depicted in FIG. 10 and FIG. 12 to FIG. 16. are sufficiently taught, suggested, and embodied in the embodiments illustrated in FIG. 1 to FIG. 9, and therefore no further description is provided herein.

In summary, in the exemplary embodiments of the invention, the optical device includes a microstructure layer and an infrared pass layer. Alternatively, the optical device includes a light absorbing layer. Accordingly, the optical device for fingerprint collection embedded into the electronic device provides a good sensing quality. In addition, the second substrate is made of the cover layer on the display panel of the electronic device, the light shielding structures and the supporting member disposed on the first substrate support the second substrate. Accordingly, the supporting strength for the second substrate is enhanced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical device, comprising:
   a first substrate;
   a light source, disposed on the first substrate to output a first light beam which is an infrared light;
   a second substrate, disposed above the first substrate, and comprising a first surface and a second surface opposite to the first surface and closer to the first substrate, wherein a scattered light beam which is generated by the first light beam entering an object touching the first surface of the second substrate and scattered in the object is a second light beam;
   an image capturing device, disposed on the first substrate to receive a third light beam, wherein the third light beam is the second light beam normally incident to the second surface and transmitted to the image capturing device;
   a microstructure layer, disposed on the first surface of the second substrate, and adapted to increase the third light beam, wherein the microstructure layer includes a plurality of ball particles with diameters ranging from 10 to 100 micrometers, or the microstructure layer is a surface of the second substrate which is made by applying a surface processing to the surface of the second substrate to make the surface rough; and
   an infrared pass layer, adapted to pass the infrared light.

2. The optical device according to claim 1, wherein the infrared pass layer, is disposed on one of the microstructure layer, the first surface of the second substrate, the second surface of the second substrate, and the image capturing device.

3. The optical device according to claim 1, further comprising:
   a first light shielding structure, disposed on the first substrate and connected to the second substrate, and located between the light source and the image capturing device.

4. The optical device according to claim 3, further comprising:
   a second light shielding structure, disposed on the first substrate and connected to the second substrate, wherein the first light shielding structure and the second light shielding structure enclose the light source.

5. The optical device according to claim 1, further comprising:
   a third light shielding structure, disposed on the first substrate, and located between the light source and the image capturing device, wherein the third light shielding structure extends toward the second substrate, and one end portion of the third light shielding structure is embedded into the second substrate.

6. The optical device according to claim 1, further comprising:
   a fourth light shielding structure, disposed on the first substrate, and located between the light source and the image capturing device, wherein the fourth light shielding structure extends toward the second substrate, and one end portion of the fourth light shielding structure has a support shape to support the second substrate.

7. The optical device according to claim 1, further comprising:
   a light guiding structure, disposed on the second surface of the second substrate and above the light source, and adapted to guide the first light beam from the light source to the second substrate.

8. The optical device according to claim 1, wherein the second substrate is made of a cover layer on a display panel of an electronic device.

9. The optical device according to claim 1, further comprising:
   at least one anti-reflective layer, disposed on at least one of the first surface and the second surface of the second substrate.

10. An optical device, comprising:
    a first substrate;
    a light source, disposed on the first substrate to output a first light beam which is an infrared light;
    a second substrate, disposed above the first substrate, and comprising a first surface and a second surface opposite to the first surface and closer to the first substrate, wherein a scattered light beam which is generated by the first light beam entering an object touching the first surface of the second substrate and scattered in the object is a second light beam;
    an image capturing device, disposed on the first substrate to receive a third light beam, wherein the third light beam is the second light beam normally incident to the second surface and transmitted to the image capturing device;
    a microstructure layer, disposed on the first surface of the second substrate, and adapted to increase the third light beam, wherein the microstructure layer includes a plurality of ball particles with diameters ranging from 10 to 100 micrometers, or the microstructure layer is a surface of the second substrate which is made by applying a surface processing to the surface of the second substrate to make the surface rough; and a light absorbing layer, disposed on one of the first surface and the second surface of the second substrate, wherein a normal projection of the light absorbing layer on the first substrate locates between the light source and the image capturing unit.

11. The optical device according to claim 10, further comprising:
an infrared pass layer, disposed on one of the first surface of the second substrate, the second surface of the second substrate and the image capturing device, and adapted to pass the infrared light.

12. The optical device according to claim 10, further comprising:
an infrared pass layer, disposed on one of the microstructure layer, the first surface of the second substrate, the second surface of the second substrate, and the image capturing device, wherein the infrared pass layer is adapted to pass the infrared light.

13. The optical device according to claim 10, wherein the light absorbing layer is adapted to absorb a fourth light beam transmitted in the second substrate along a horizontal direction.

14. The optical device according to claim 10, further comprising:
a first light shielding structure, disposed on the first substrate and connected to the second substrate, and located between the light source and the image capturing device.

15. The optical device according to claim 14, further comprising:
a second light shielding structure, disposed on the first substrate and connected to the second substrate, wherein the first light shielding structure and the second light shielding structure enclose the light source.

16. The optical device according to claim 10, further comprising:
a third light shielding structure, disposed on the first substrate, and located between the light source and the image capturing device, wherein the third light shielding structure extends toward the second substrate, and one end portion of the third light shielding structure is embedded into the second substrate.

17. The optical device according to claim 10, further comprising:
a fourth light shielding structure, disposed on the first substrate, and located between the light source and the image capturing device, wherein the fourth light shielding structure extends toward the second substrate, and one end portion of the fourth light shielding structure has a support shape to support the second substrate.

18. The optical device according to claim 10, further comprising:
a light guiding structure, disposed on the second surface of the second substrate and above the light source, and adapted to guide the first light beam from the light source to the second substrate.

19. The optical device according to claim 10, wherein the second substrate is made of a cover layer on a display panel of an electronic device.

20. The optical device according to claim 10, further comprising:
at least one anti-reflective layer, disposed on at least one of the first surface and the second surface of the second substrate.

* * * * *